(12) United States Patent
Crew et al.

(10) Patent No.: US 7,446,784 B2
(45) Date of Patent: Nov. 4, 2008

(54) DISPLAYING A PLURALITY OF IMAGES IN A STACK ARRANGEMENT

(75) Inventors: Laurence Crew, Redfern (AU); Andrew John Shellshear, Marrickville (AU)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 11/281,595

(22) Filed: Nov. 18, 2005

(65) Prior Publication Data

US 2006/0214953 A1  Sep. 28, 2006

(30) Foreign Application Priority Data

Nov. 19, 2004 (AU) ............................... 2004231206

(51) Int. Cl.
  *G09G 5/00*  (2006.01)
  *G06F 17/00*  (2006.01)
(52) U.S. Cl. ...................................... 345/679; 715/243
(58) Field of Classification Search ....................... None
  See application file for complete search history.

(56) References Cited

U.S. PATENT DOCUMENTS

| | | | | |
|---|---|---|---|---|
| 5,754,809 A | * | 5/1998 | Gandre | ....................... 715/782 |
| 6,012,072 A | * | 1/2000 | Lucas et al. | .................. 715/526 |
| 6,018,333 A | * | 1/2000 | Denber | ........................ 715/790 |
| 7,139,006 B2 | * | 11/2006 | Wittenburg et al. | ......... 345/679 |
| 2001/0043235 A1 | * | 11/2001 | Best et al. | .................... 345/781 |
| 2005/0094207 A1 | | 5/2005 | Lo et al. | ...................... 358/1.18 |
| 2005/0210416 A1 | * | 9/2005 | MacLaurin et al. | ......... 715/851 |

FOREIGN PATENT DOCUMENTS

WO  WO 2005/096218 A1  10/2005

* cited by examiner

*Primary Examiner*—Kee M. Tung
*Assistant Examiner*—Michelle K Lay
(74) *Attorney, Agent, or Firm*—Fitzpatrick, Cella, Harper & Scinto

(57) ABSTRACT

A method (700) of displaying a plurality of images is disclosed. The method (700) displays the images in a stack arrangement. The stack may be a perspective stack and a non-perspective stack. Another method (1200) of displaying a plurality of images is also disclosed. The method (1200) displays the images in a stack following any arbitrary path. The methods (700) and (1200) are particularly advantageous for displaying a collection of images of irregular sizes and aspect ratios. The methods (700) and (1200) maintain the regular geometric layout of a stack of images and also ensure that the size of the minimum visible area of each image in the stack remains the same irrespective of the aspect ratio of a particular image.

43 Claims, 14 Drawing Sheets

DISPLAYING A PLURALITY OF IMAGES IN A STACK ARRANGEMENT

FIELD OF THE INVENTION

The present invention relates generally to image processing and, in particular, to a method and apparatus for displaying a plurality of images. The present invention also relates to a computer program product including a computer readable medium having recorded thereon a computer program for displaying a plurality of images.

BACKGROUND

In recent times, image scanners, video capture cards and digital still and video cameras have made it easier for people to capture photographs, video sequences and other images. These images are often stored on personal computers and other computer related devices. Due to the large number of images that are often stored on these devices, there is a need for users of such devices to be able to access the stored images for viewing, sharing and organisation. Software applications (e.g., image browser software applications) and dedicated devices have been developed to aid users in the tasks of viewing, sharing and organising collections of images.

When viewing a collection of captured and stored images on a computer screen or the like, using an image browser software application, for example, the images are typically displayed as a two dimensional (2D) grid of small images known as a 'thumbnail grid'. For example, FIG. 1 shows an application window 100 of a user interface comprising a thumbnail grid 105. The thumbnail grid 105 comprises a plurality of images including images 102, 103 and 104. The remaining non-referenced rectangles shown in phantom lines in FIG. 1 also represent images. However, the images represented by these remaining rectangles will not be referred to specifically. A reference to "the images 102, 103 and 104" below will be considered to generically refer to all of the images represented in FIG. 1 including the images shown in phantom lines, unless a reference is made to a specific image (e.g., the image 102).

The image 102 of FIG. 1 is a photograph in landscape orientation, the image 104 is a photograph in portrait orientation and the image 103 is a panoramic photograph.

The images 102, 103 and 104 of the application window 100 may alternatively be arranged as a 'stack' 205, as seen in FIG. 2. The application window 100 comprising the images 102, 103, 104 arranged as the stack 205 may also be used as part of the user interface of an image browser application, for example. As seen in FIG. 2, in the stack 205, the first image 102 is displayed in front of (or at the top of) the stack 205 with each subsequent image 103 and 104 being displayed behind (or below) a previous image. Each subsequent image 103 and 104 of the stack 205 is typically offset in one or more directions so that a portion of each image (e.g., 103) may be seen behind a previous image. For example, a portion 106 of the image 103 is seen behind the first image 102.

Navigation of the collection of images 102, 103 and 104 in the stack 205 may be performed by moving the viewpoint of a user forward or backwards with respect to the stack 205. Navigation of the images 102, 103 and 104 may also be performed by re-shuffling the order of the images 102, 103, 104 in the stack 205.

The ratio between the width and height of an image is commonly referred to as the 'aspect ratio' of the image. A common property of the images within a collection of images is that there is a range of different sizes and aspect ratios. This is especially the case when the images of the collection are oriented so that their content is suitable for viewing. For example, when taking photographs, it is common for a photographer to orient a camera in either 'landscape' (or 'wide') orientation for certain types of images or in 'portrait' (or 'tall') orientation for other types of images. Additionally, 'panoramic' (very wide) images may exist within a collection of images. Further, video images often have a different aspect ratio compared to still images. A user may also crop or resize images to any particular size or aspect ratio depending on the content of the images and the particular preferences of the user.

Having a collection of images with different sizes and aspect ratios can cause a problem for image browser software applications, for example, in which a collection of images is being displayed as a regular geometric layout, such as the thumbnail grid 105 of FIG. 1. In particular, larger sized images affect the layout of the images so that a regular geometric layout may no longer be possible and/or the same number of images may not be able to be displayed within the application window 100 as if the images were of the same size. This problem may be overcome by using a 'bounding box' of regular size and shape to display each image of the collection. In this instance, each image may be scaled to fit wholly within a corresponding bounding box whilst maintaining the aspect ratio of the image. For example, each of the images 102, 103 and 104 of the thumbnail grid 105 has a corresponding bounding box 102A, 103A and 104A. As seen in FIG. 1, each of the images 102, 103 and 104 has been scaled to fit wholly within the corresponding bounding box 102A, 103A and 104A, respectively.

However, a disadvantage of scaling the images 102, 103 and 104 to fit within the bounding boxes 102A, 103A and 104A is that the relative proportion of space used to display each image in the application window 100 must vary according to the aspect ratio of each image. A very wide 'panoramic' photographic image will fill only a small proportion of the bounding box corresponding to the image as the relative height of the image is small compared to the width of the image. For example, as described above, the image 102 is a photograph in landscape orientation, the image 104 is a photograph in portrait orientation and the image 103 is a panoramic photograph. As seen in FIG. 1, the image 103 fills a smaller proportion of the bounding box 103A compared with the images 102 and 104 and their corresponding bounding boxes 102A and 104A, respectively. In fact, the image 103 only fills a small portion of the bounding box 103A and any remaining space in the bounding box 103A is unused.

When bounding boxes such as the bounding boxes 102A, 103A and 104A are used in the stack 205 of FIG. 2, the problem of unused space in the bounding boxes 102A, 103A and 104A is compounded. This is because with the exception of the front-most bounding box 102A, only a portion of each bounding box 103A and 104A is visible. For some images, all of the visible portion of a corresponding bounding box may be empty of any actual content. As seen in FIG. 2, the stack 205 comprises the images 102, 103 and 104 with corresponding bounding boxes 102A, 103A and 104A, arranged in perspective. The front-most bounding box 102A is shown in full with each of the other bounding boxes 103A, 104A being partially obscured by the bounding box in front. For the bounding boxes 103A and 104A, the visible portion of the bounding boxes 103A and 104A contains a significant proportion of unused space. This is due to the mismatch between the aspect ratios of the bounding boxes 103A and 104A and the aspect ratios of the corresponding images 103 and 104 contained within the bounding boxes 103A and 104A, respectively.

Thus a need clearly exists for a more efficient method of displaying a plurality of images, particularly where the images have irregular sizes and aspect ratios.

SUMMARY

It is an object of the present invention to substantially overcome, or at least ameliorate, one or more disadvantages of existing arrangements.

According to one aspect of the present invention there is provided a method of displaying a plurality of images, each image having an associated aspect ratio and at least one of said images having a different aspect ratio to at least one other of said images, said method comprising the steps of:

displaying a first of said images, said first image being scaled so that a selected side of said first image is fitted to a corresponding side of a first region associated with said first image; and displaying a second of said images substantially behind said first image, said second image being scaled so that a selected side of said second image is fitted to a corresponding side of a second region associated with said second image, wherein the aspect ratios of said first and second images are maintained.

According to another aspect of the present invention there is provided a method of displaying a plurality of images on a display device, each image having first and second dimensions defining an aspect ratio and at least one image of said images having a different aspect ratio to at least one other of said images, said method comprising the steps of:

displaying a first of said images, the first and second dimensions of said first image being scaled so as to maintain the aspect ratio of said first image; and displaying a second of said images substantially behind said first image, the first and second dimensions of said second image being scaled so as to maintain the aspect ratio of said second image, wherein at least one of the first and second scaled dimensions of said second image are determined, by a processor, according to a predetermined ratio with respect to a corresponding scaled dimension of said first image.

According to still another aspect of the present invention there is provided a method of displaying a plurality of images, said method comprising the steps of:

displaying a first of said plurality of images, said first image being scaled so that a selected side of said first image is fitted to a corresponding side of a predetermined region; and displaying a second of said plurality of images substantially behind said first image, wherein said second image is positioned according to a predetermined ratio based on said predetermined region.

According to still another aspect of the present invention there is provided an apparatus for displaying a plurality of images, each image having an associated aspect ratio and at least one of said images having a different aspect ratio to at least one other of said images, said apparatus comprising at least a display means for displaying a first of said images, said first image being scaled so that a selected side of said first image is fitted to a corresponding side of a first region associated with said first image, and for displaying a second of said images substantially behind said first image, said second image being scaled so that a selected side of said second image is fitted to a corresponding side of a second region associated with said second image, wherein the aspect ratios of said first and second images are maintained.

According to still another aspect of the present invention there is provided an apparatus for displaying a plurality of images on a display device, each image having first and second dimensions defining an aspect ratio and at least one image of said images having a different aspect ratio to at least one other of said images, said apparatus comprising at least a display means for displaying a first of said images, the first and second dimensions of said first image being scaled so as to maintain the aspect ratio of said first image, and for displaying a second of said images substantially behind said first image, the first and second dimensions of said second image being scaled so as to maintain the aspect ratio of said second image.

According to still another aspect of the present invention there is provided a computer program for displaying a plurality of images, each image having an associated aspect ratio and at least one of said images having a different aspect ratio to at least one other of said images, said program comprising:

code for displaying a first of said images, said first image being scaled so that a selected side of said first image is fitted to a corresponding side of a first region associated with said first image; and code for displaying a second of said images substantially behind said first image, said second image being scaled so that a selected side of said second image is fitted to a corresponding side of a second region associated with said second image, wherein the aspect ratios of said first and second images are maintained.

According to still another aspect of the present invention there is provided a computer program for displaying a plurality of images on a display device, each image having first and second dimensions defining an aspect ratio and at least one image of said images having a different aspect ratio to at least one other of said images, said program comprising:

code for displaying a first of said images, the first and second dimensions of said first image being scaled so as to maintain the aspect ratio of said first image; and code for displaying a second of said images substantially behind said first image, the first and second dimensions of said second image being scaled so as to maintain the aspect ratio of said second image.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
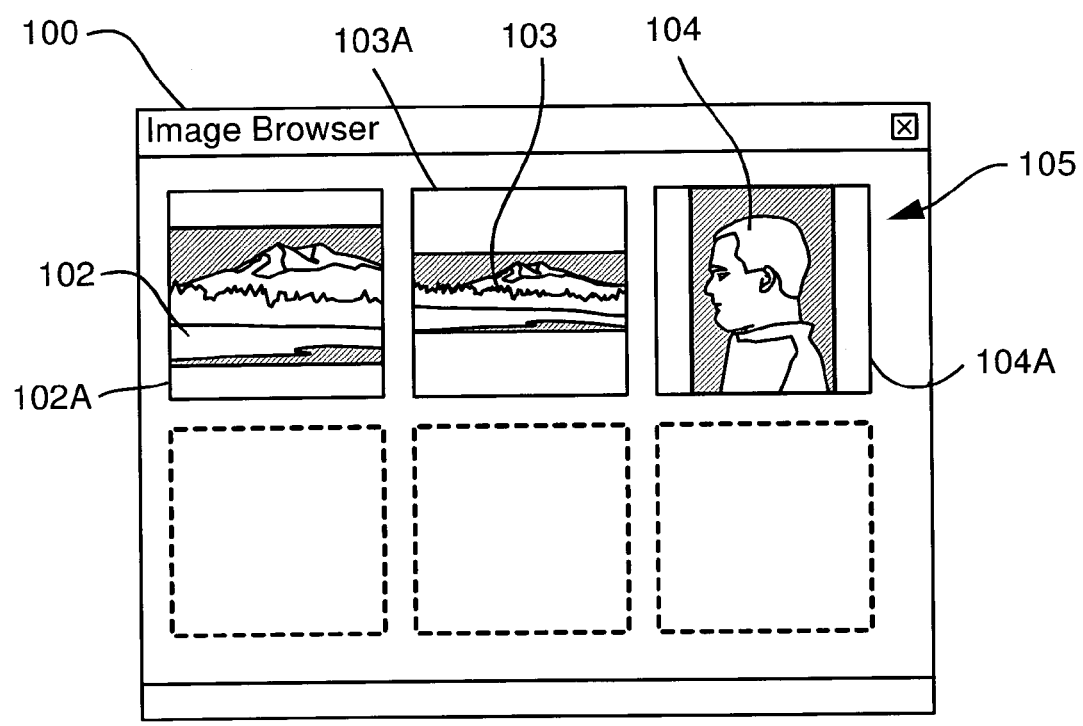
FIG. 1 shows an application window comprising images arranged as a thumbnail grid.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Figure 2:
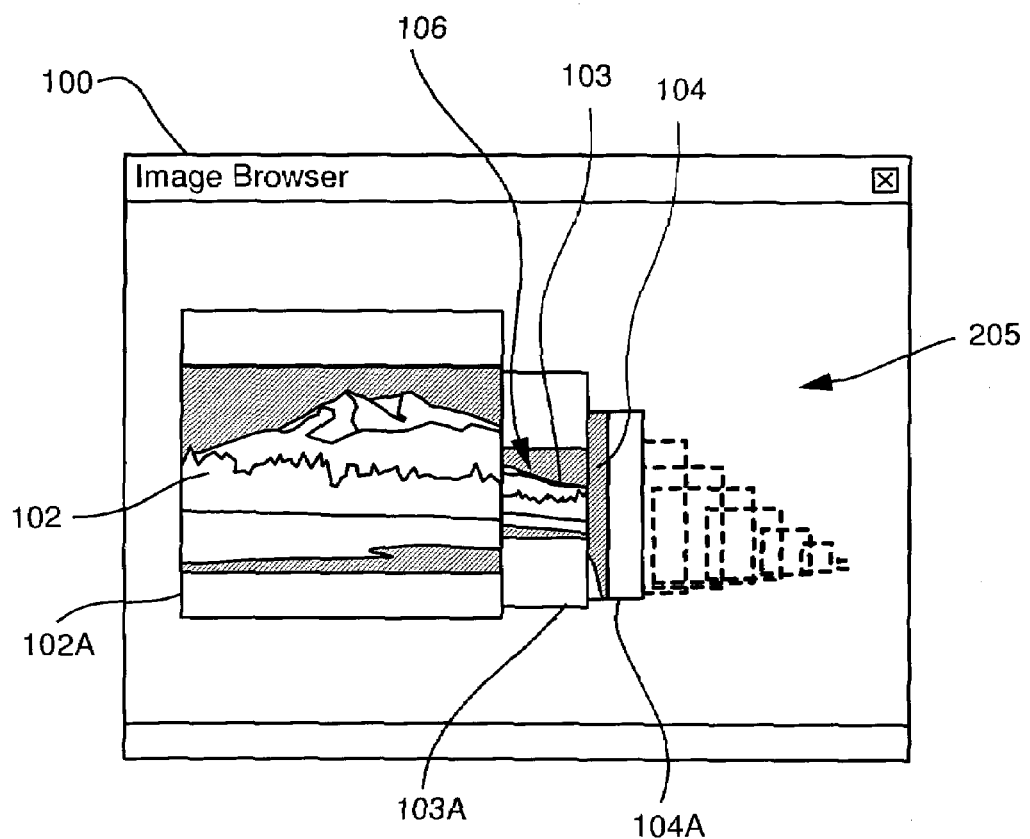
FIG. 2 shows the application window of FIG. 1 with the images arranged in a stack.

Arranging images in a stack arrangement such as the stack 205 of FIG. 2 has several advantages over arranging images in accordance with the 'thumbnail grid' 105 of FIG. 1. In the stack 205, one or more of the images 102, 103 and 104 may be shown at a larger size whilst allowing the same number of images to be displayed within the area of the application window 100 as are able to be displayed using the thumbnail grid 105. Navigation and selection of the images 102, 103 and 104 arranged as the stack 205 may be performed within a single dimension as opposed to two dimensions. This reduces the complexity of interaction with a software application, such as an image browser application, implementing the application window 100.

Figure 7:
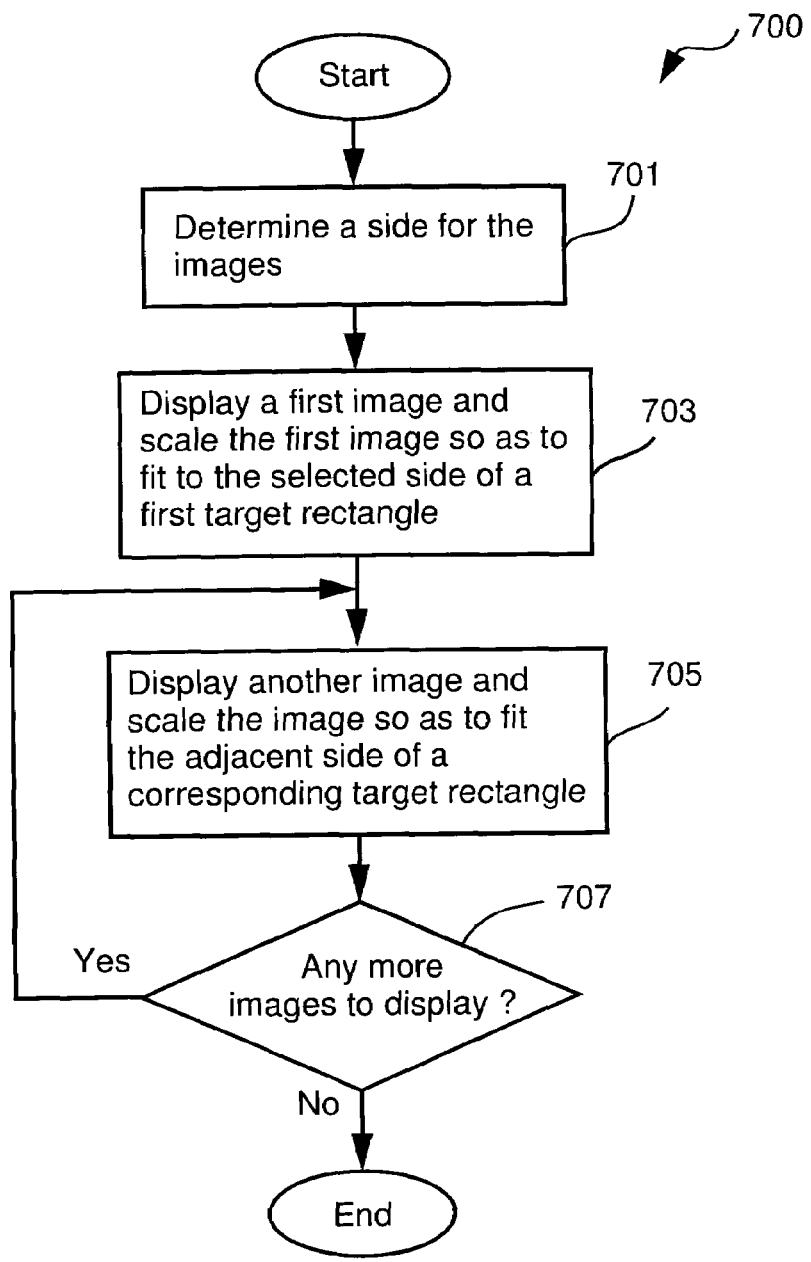
FIG. 7 shows a method of displaying a plurality of images.
Figure 12:
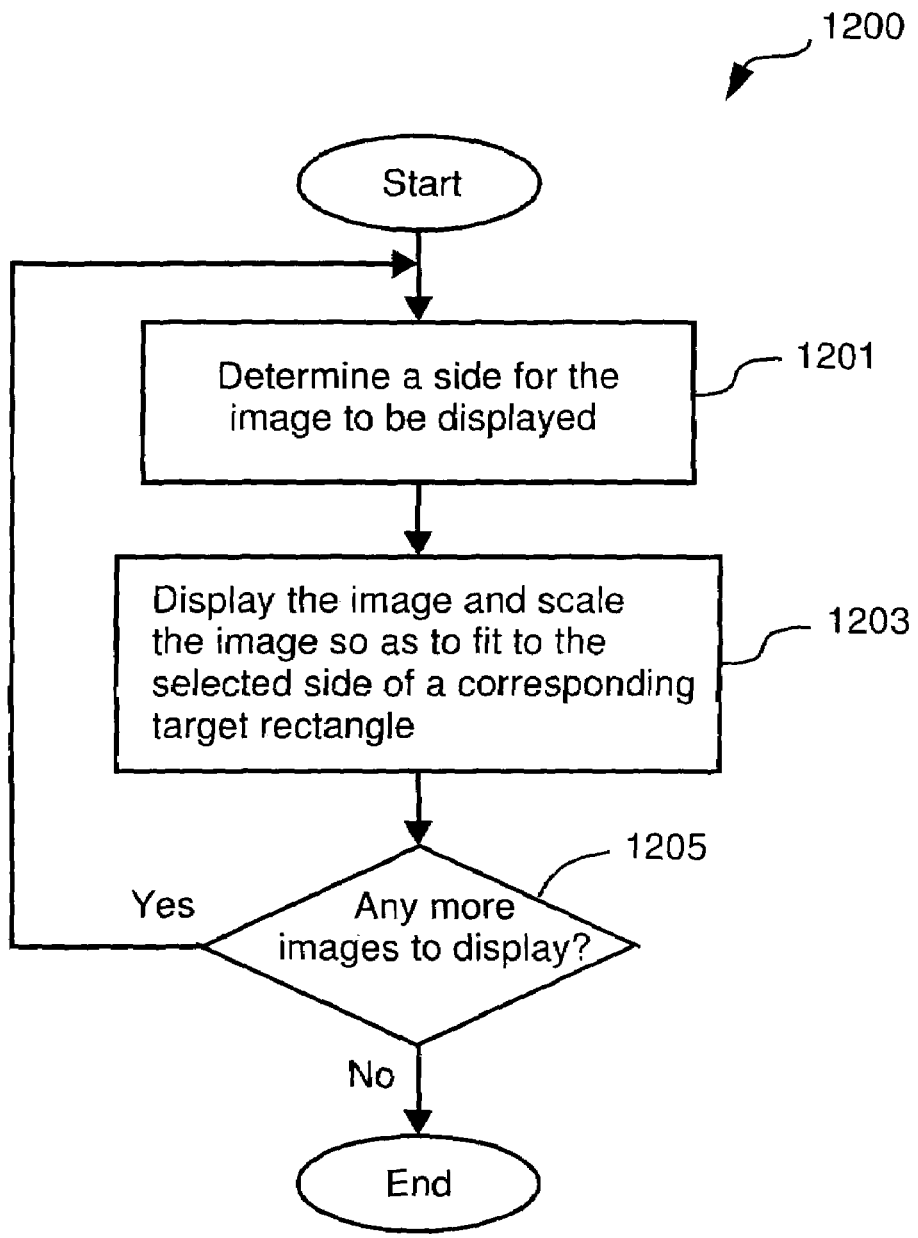
FIG. 12 shows another method of displaying a plurality of images.

A method 700 of displaying a plurality of images is shown in FIG. 7. The method 700 displays the images in a stack arrangement. As will be described in detail below, the stack may be a perspective stack and a non-perspective stack. Another method 1200 of displaying a plurality of images is shown in FIG. 12. The method 1200 displays the images in a stack following any arbitrary path. The methods 700 and 1200 are particularly advantageous for displaying a collection of images of irregular sizes and aspect ratios. The methods 700 and 1200 maintain the regular geometric layout of a stack of images and also ensure that the size of the minimum visible area of each image in the stack remains the same irrespective of the aspect ratio of a particular image.

Figure 3:
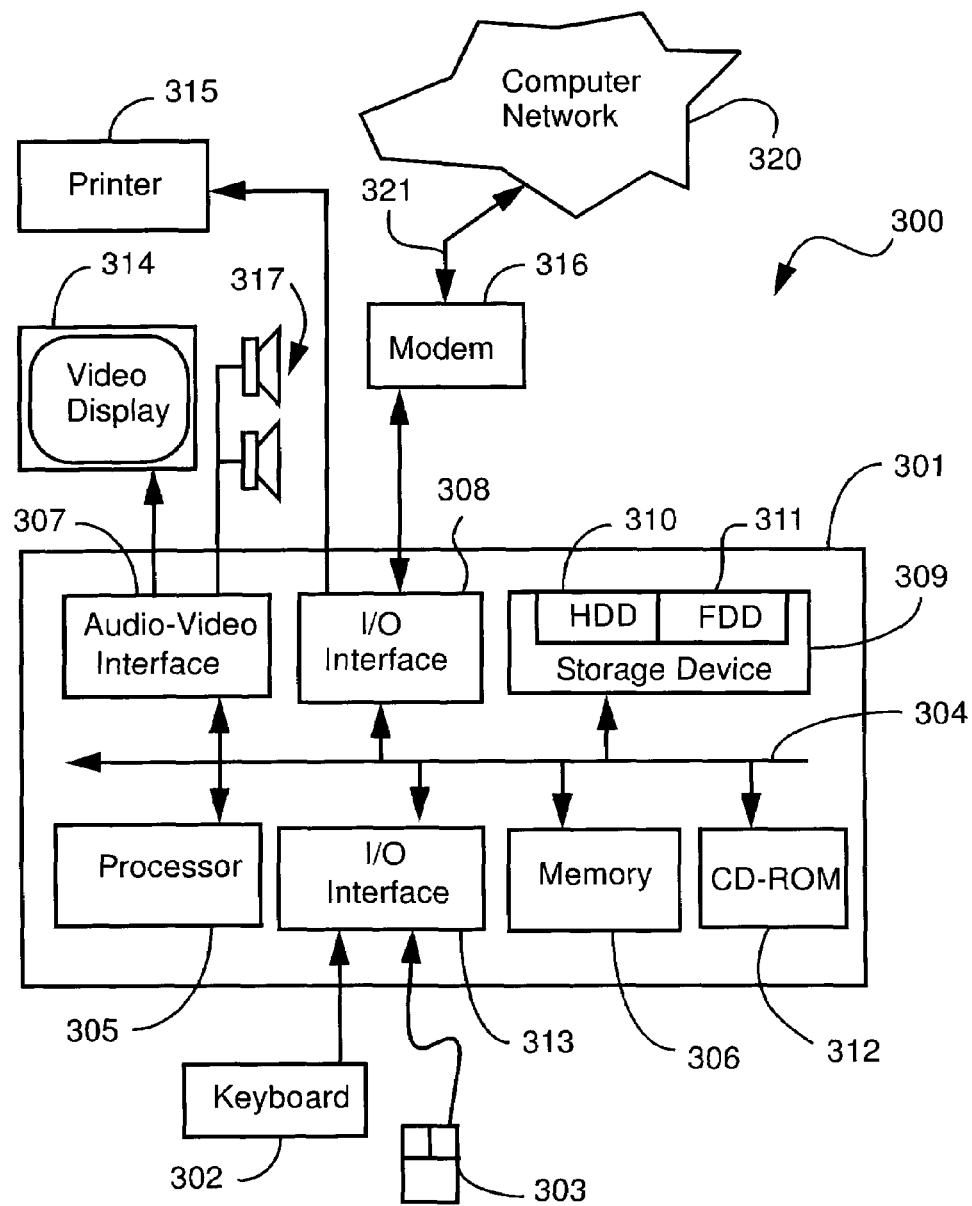
FIG. 3 is a schematic block diagram of a general-purpose computer upon which arrangements described may be practiced.

The methods 700 and 1200 are preferably practiced using a general-purpose computer system 300, such as that shown in FIG. 3 wherein the processes of FIGS. 1, 2 and 4 to 11 may be implemented as software, such as an image browser application program executing within the computer system 300. In particular, the steps of the methods 700 and 1200 may be implemented by instructions in the software that are carried out by the computer system 300. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software may be loaded into the computer from the computer readable medium, and then executed by the computer. A computer readable medium having such software or computer program recorded on it is a computer program product. The use of the computer program product in the computer preferably affects an advantageous apparatus for implementing the described methods.

The computer system 300 is formed by a computer module 301, input devices such as a keyboard 302 and mouse 303, output devices including a printer 315, a display device 314 and loudspeakers 317. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN), and may be incorporated into the computer module 301 in some implementations.

The computer module 301 typically includes at least one processor unit 305, and a memory unit 306, for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 313 for the keyboard 302 and mouse 303 and optionally a joystick (not illustrated), and an interface 308 for the modem 316 and printer 315. In some implementations, the modem 316 may be incorporated within the computer module 301, for example within the interface 308. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, may communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations or alike computer systems evolved therefrom.

Typically, the image browser application program implementing the method 700 is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable media. The term "computer readable medium" as used herein refers to any storage or transmission medium that participates in providing instructions and/or data to the computer system 300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including e-mail transmissions and information recorded on Websites and the like.

The methods 700 and 1200 may alternatively be implemented in dedicated hardware such as one or more integrated circuits performing the functions or sub functions of FIGS. 1 to 2 and 4 to 12. Such dedicated hardware may include graphic processors, digital signal processors, or one or more microprocessors and associated memories.

Figure 6:
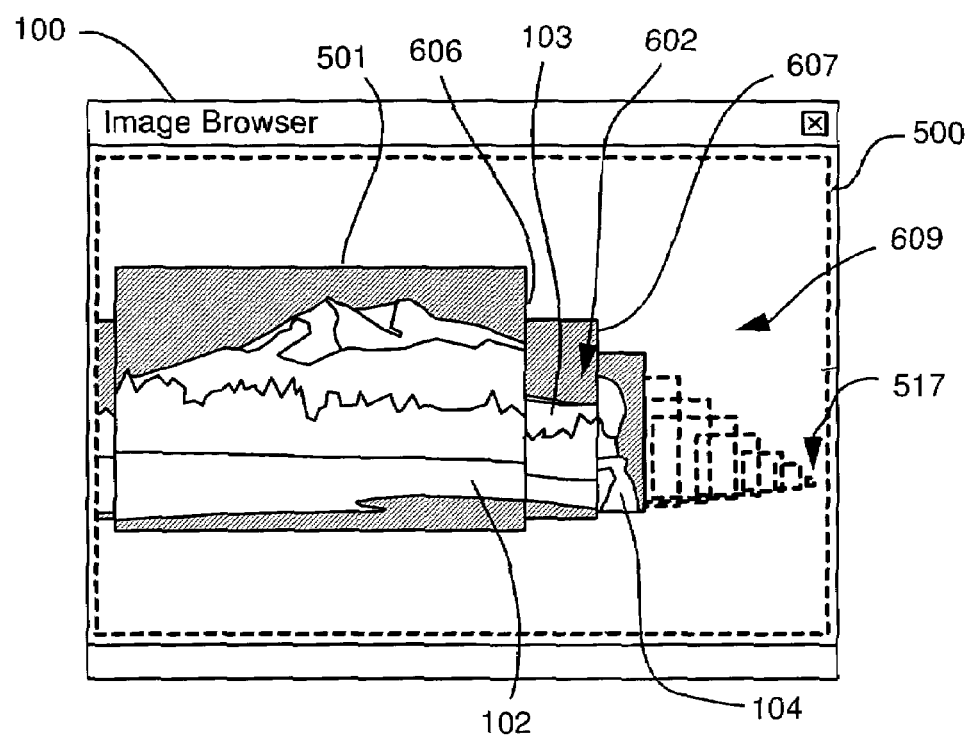
FIG. 6 shows the application window of FIG. 1 with the images arranged in a perspective stack according to the arrangement of target rectangles of FIG. 5.

In one implementation of the method 700, the images 102, 103 and 104 of the application window 100 are arranged in a perspective stack 609 with each subsequent image (e.g., 103 and 104) in the stack 609 being partially obscured by the image (e.g., 102) in front, as seen for example in FIG. 6. The images of the stack 609 may be navigated by moving the viewpoint of a user forward or backwards with respect to the stack 609. The front-most image 102 of the stack 609 is shown in full and is considered to be a "currently selected image." Each of the subsequent images (e.g., 103, 104) in the stack 609 is shown at a relatively smaller size as the images are positioned towards the back (or bottom) of the stack 609. The arrangement of the images 102, 103, 104 in the stack 609 improves the perception of depth for a user and provides a more realistic representation of the stack 609. The arrangement of the images 102, 103 and 104 in the stack 609 also allows for more images to be represented within the application window 100, for example, as the images arranged as the stack 609 take up less space and are displayed closer together towards the back of the stack 609.

Figure 4:
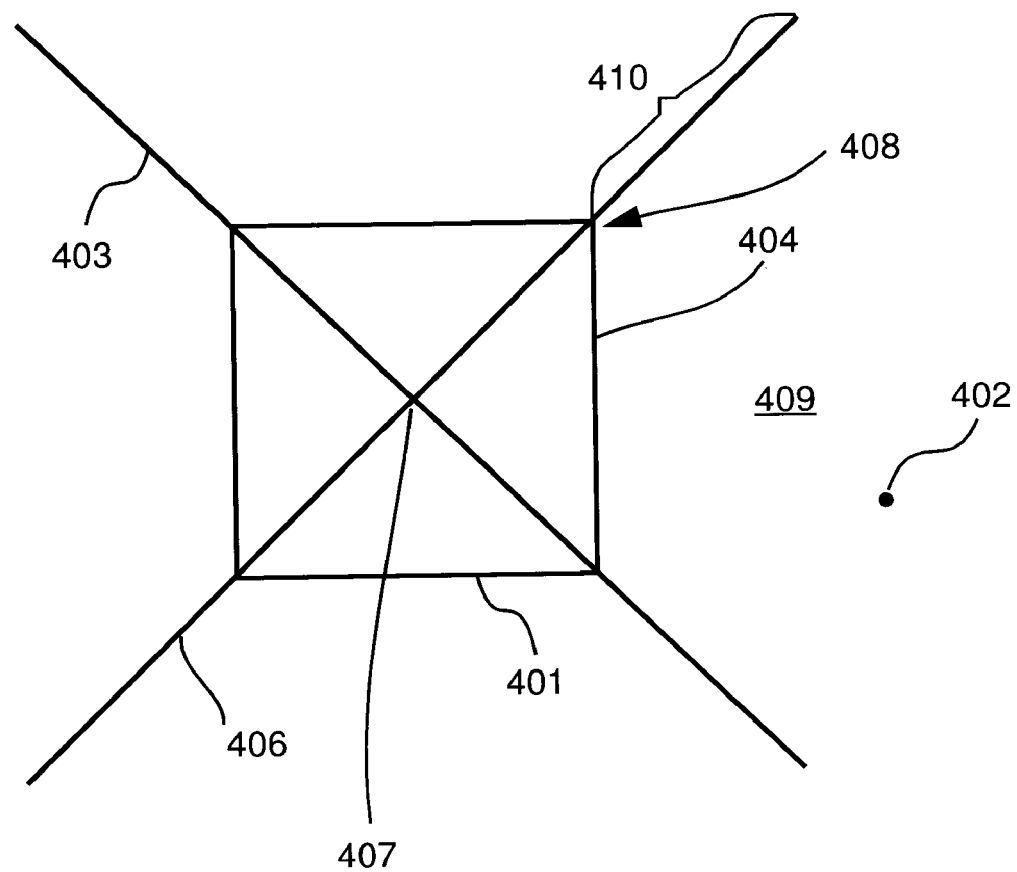
FIG. 4 shows a target rectangle divided into four quadrants by dividing lines.

The method 700 may be implemented as software resident in the hard disk drive 310 and being controlled in its execution by the processor 305. The method 700 begins at step 701, where the processor 305 selects a side for the plurality of images to be displayed. For the perspective stack 609, the selected side is determined based on the position of one or more target rectangles and the position of a predetermined vanishing point (or perspective point). For example, FIG. 4 shows a target rectangle 401 which may be used in step 701. FIG. 4 also shows a vanishing point 402 and an edge 404. The target rectangle 401 is shown with diagonal dividing lines 403 and 406 intersecting at a centre point 407 and passing through diagonally opposite vertices (e.g., 408) of the target rectangle 401. The diagonal dividing lines 403 and 406 form four quadrants (e.g., 409) in a space within and surrounding the target rectangle 401. Each quadrant (e.g., 409) frilly encompasses one edge (e.g. 404) of the target rectangle 401.

The vanishing point 402 may be positioned arbitrarily in the space within or surrounding the target rectangle 401 exclusive of the centre point 407 of the target rectangle 401 and may fall within any one of the quadrants (e.g., 409). Alternatively, the vanishing point 402 may fall exactly on one of the diagonal dividing lines 403 and 406. A vanishing point falling exactly on one of the diagonal dividing lines may be assumed to fall within the quadrant immediately adjacent to a corresponding segment (in a clockwise direction) of the dividing line on which the vanishing point falls. For example, if the vanishing point 402 falls directly on segment 410 of the dividing line 406, then the vanishing point 402 may be assumed to fall within the quadrant 409, as seen in FIG. 4.

The edge 404 of the target rectangle 401 falls within the same quadrant 409 as the vanishing point 402 and is referred to as an "adjacent edge" of the target rectangle 401. The adjacent edge 404 corresponds to the "adjacent side" of the target rectangle 401.

Figure 5:
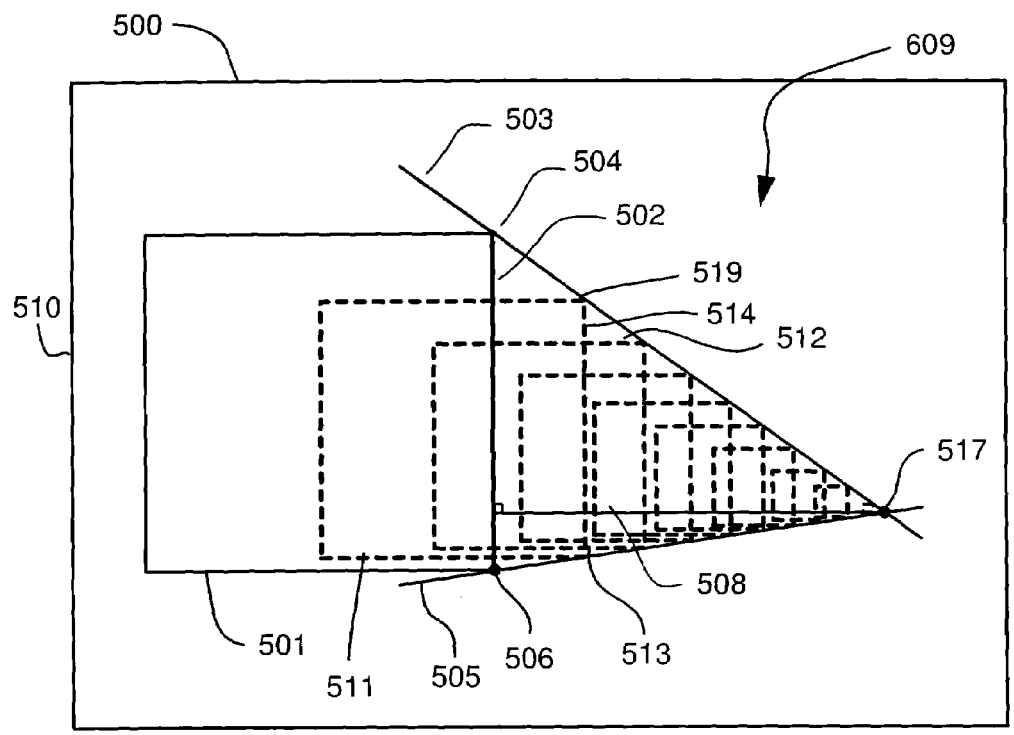
FIG. 5 shows a series of target rectangles arranged in a perspective stack within an application boundary.

FIG. 5 shows a series of target rectangles 501, 511 and 512, arranged in a perspective stack 609 within an application boundary 500. The remaining non-referenced rectangles shown in phantom lines in FIG. 5 also represent target rectangles. However, these remaining rectangles will not be referred to specifically. A reference to "the target rectangles 501, 511 and 512" below refers to all of the target rectangles shown in FIG. 5 including the target rectangles shown in phantom lines, unless a target rectangle (e.g., the rectangle 511) is referred to specifically. The arrangement of the target rectangles 501, 511 and 512 may be used in the method 700.

The size of the application boundary 500 may be determined by the size of the application window 100 of the image browser application program implementing the method 700, such that the application boundary 500 fits within the application window 100. The target rectangles 501, 511 and 512 are arranged in the stack 609. The first target rectangle 501 of the stack 609 appears within the application boundary 500 aligned to one side 510. FIG. 5 also shows the vanishing point 517 (or perspective point) for the target rectangles of FIG. 5. The vanishing point 517 may be pre-determined and may exist at any point including points outside the application boundary 500. The vanishing point 517 may be within the first target rectangle 501. However, if the vanishing point 517 is within the first target rectangle 501, target rectangles (e.g., 511) shown behind the first target rectangle 501 may be completely obscured.

As seen in FIG. 5, the vanishing point 517 is positioned opposite to the first target rectangle 501 in a horizontal direction. The vanishing point 517 is also adjacent to the first target rectangle 501 in the vertical direction. The position and dimensions of the first target rectangle 501 and the position of the vanishing point 517 may be determined automatically by the processor 305 at any time based on the size of the application boundary 500. For example, the position and dimensions of the first target rectangle 501 and the position of the vanishing point 517 may be determined upon resizing of the application window 100 containing the application boundary 500. The dimensions of the first target rectangle 501 may be reduced as the size of the application boundary 500 is reduced. Further, the dimensions of the first target rectangle 501 may be increased as the size of the application boundary 500 is increased.

Perspective lines 503 and 505 pass through the vanishing point 517 and through the end vertices 504, 506 of the adjacent edge 502 (i.e., the edge of the target rectangle 501 that falls within the same quadrant as the vanishing point 517), respectively. A perpendicular interval 508 runs from the vanishing point 517 to the adjacent edge 502, and is perpendicular to the adjacent edge 502.

The target rectangles 501, 511 and 512 are positioned such that the end vertices of the adjacent edge of each target rectangle intersect with the perspective lines 503, 505 and the target rectangle is scaled accordingly. For example, the end vertices 519 and 513 of the adjacent edge 514 of the target rectangle 511 intersect the perspective lines 503 and 504, respectively.

The adjacent edge of each of the target rectangles 501, 511 and 512 is spaced along the perpendicular interval 508 according to Formula (1) as follows:

$$\text{dist} = l.(i/n)^{0.4} \tag{1}$$

where:

i=0 for the first target rectangle 501; and i=1 for the target rectangle 511 immediately behind the first target rectangle 501, and so on;

dist represents the distance along the perpendicular interval 508 from the adjacent edge 502 of the first target rectangle 501 to the adjacent edge of a target rectangle i at which distance the adjacent edge of target rectangle i intersects with the perpendicular interval 508;

l represents the length of the perpendicular interval 508;

n represents the total number of target rectangles that are simultaneously shown in the stack 509, before the stack 509 vanishes into perspective. For the stack 506, n=10.

The method 700 continues at the next step 703, where the processor 305 displays a first image. The first image may be displayed on the display device 314, for example. At step 703, the processor 305 scales the first image so as to fit the selected side of the first image, as selected at step 701, to the adjacent edge side of a target rectangle. For example, FIG. 6 shows the images 102, 103 and 104 arranged in the stack 609 according to the arrangement of the target rectangles 501, 511 and 512 of FIG. 5. The images 102, 103 and 104 are configured within the application boundary 500. The application window 100 defines the application boundary 500. The first (or front-most) image 102 is positioned according to the first target rectangle 501. A side 606 of the image 102, as seen in FIG. 6, corresponds to the adjacent edge 502 of the target rectangle 501. The side 606 of the image 102 is also matched in length to the adjacent edge 502.

At the next step 705, the processor 305 displays a second image, such that the first image overlays the second image. The second image may be displayed on the display device 314, for example. At step 705, the second image is scaled so as to fit a predetermined side of the second image to the corresponding adjacent side of a target rectangle. The second image is scaled so as to maintain the aspect ratio of the second image.

For the stack 609, the second image is positioned a predetermined distance, dist, along the perpendicular interval 508 from the first image according to Formula 1 above. As seen in FIG. 6 each successive image is positioned according to each successive target rectangle. For example, the image 103 is positioned according to the target rectangle 511 and the image 104 is positioned according to the target rectangle 512.

For the stack 609, each of the images 102, 103 and 104 is scaled such that the side of the image that corresponds to the adjacent edge of the corresponding target rectangle is matched in length to that adjacent edge, whilst maintaining the aspect ratio of the image. As seen in FIG. 6, the side 607 of the image 103 that corresponds in position to the adjacent edge 514 of the target rectangle 511 is matched in length to the adjacent edge 514. Further, each image 102, 103 and 104 is positioned such that the side of the image that corresponds to the adjacent edge of the corresponding target rectangle is matched in position to that adjacent edge. For example, the position of the side 607 of the image 103, as seen in FIG. 6, corresponds to the position of the adjacent edge 514 of the target rectangle 511.

Following step 705, at the next step 707, if the processor 305 determines that there are more images to be displayed, the method 700 returns to step 705. Otherwise, the method 700 concludes.

As seen in FIG. 6, all visible portions of each of the target rectangles 501, 511 and 512 are utilised to display a corresponding portion of the image 102, 103 and 104, respectively. The size of the minimum visible area of each image in each of the target rectangles in the stack 609 is independent of the aspect ratio of the particular image.

For the stack 609, two effects may be observed in FIG. 6 for images that vary substantially in aspect ratio from other images. Firstly, the panoramic photographic image 103 is substantially wider than the image 102. As such, a portion of the image 103 is visible on the side of the stack 609 opposite to the side of the image 103 that corresponds to the adjacent edge of the corresponding target rectangle. Secondly, the image 103 is wide enough to exceed the application boundary 500 on the left hand side of the image 103, as seen in FIG. 6, and is therefore clipped.

The clipping of the image 103 is not a significant problem since the image 103 has a corresponding minimum visible area 602. If the maximum range of aspect ratios for a collection of images displayed in accordance with the stack 609 is known, then all images of the collection may be displayed without clipping by appropriately sizing and placing the first target rectangle 501 within the application boundary 500.

The arrangement of objects, such as the target rectangles 501, 511 and 512 in perspective may be implemented using a two dimensional (2D) graphics system. Alternatively, the arrangement of the target rectangles 501, 511 and 512 in perspective may be implemented using a three dimensional (3D) graphics system where certain calculations for determining projected 2D positions and dimensions of objects may be performed by the 3D graphics system.

When the target rectangles are arranged using a 3D graphics system, the target rectangles may be set on planes progressively offset in a z dimension. The planes of the target rectangles may also be offset in a direction parallel to the x-y plane from the initial target rectangle, towards a 'virtual' vanishing point. The virtual vanishing point may be offset from an actual vanishing point of the 3D scene in a direction parallel to the x-y plane, where the x-y plane is substantially parallel to the viewpoint of a user of the methods described herein.

Offsetting the planes of the target rectangles in a direction parallel to the x-y plane enables the viewing plane to be perpendicular to the target rectangle planes. This avoids distortion of target rectangles and associated images by perspective, without causing the target rectangles to be entirely obscured behind one another.

Figure 13:
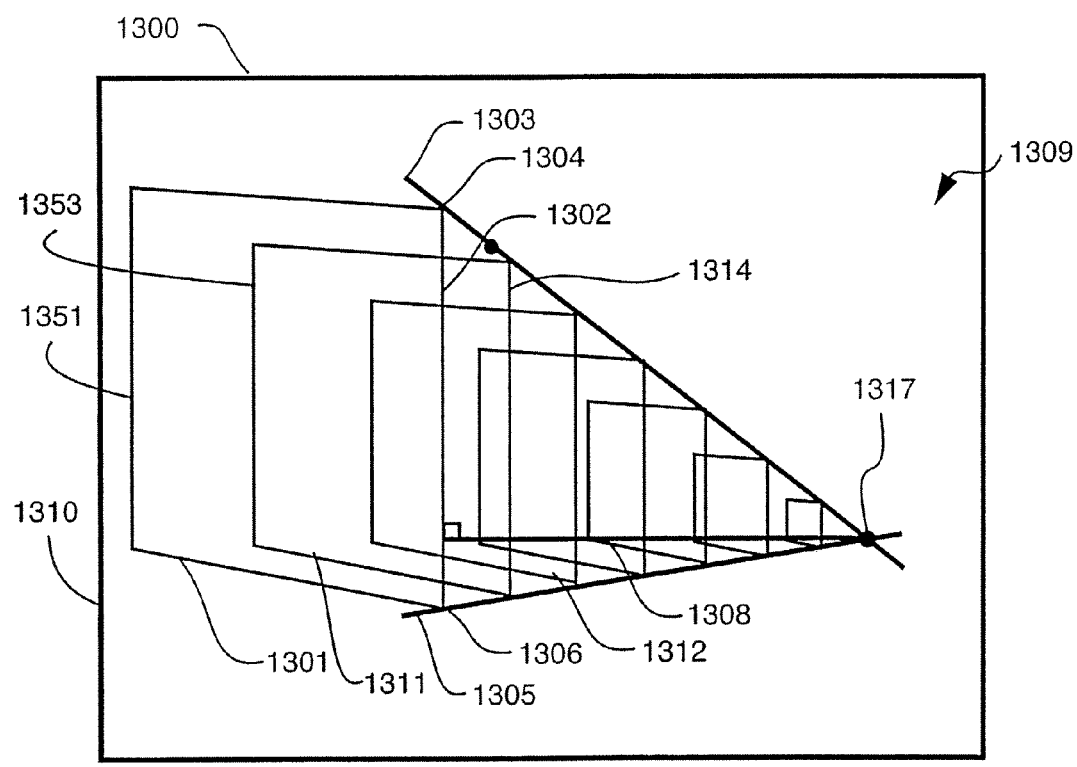
FIG. 13 shows another series of target rectangles arranged in a 3D perspective stack within an application boundary.

For the stack 609, the target rectangles 501, 511 and 512 and corresponding images 102, 103 and 104 are arranged in the perspective stack 609. Each of the target rectangles 501, 511 and 512 are parallelograms so that the stack 609 appears to be two dimensional (2D). FIG. 13 shows another series of target rectangles 1301, 1311 and 1312 arranged in a three dimensional (3D) perspective stack 1309 within an application boundary 1300. The stack 1309 may be used in another implementation of the method 700. Each of the target rectangles 1301, 1311 and 1312 is a trapezoid with a left edge (e.g., 1351) of the target rectangle (e.g., 1301) being smaller than a right edge (e.g., 1302) of the target rectangle (e.g., 1301). This provides a 3D perspective effect to the stack 1309.

FIG. 13 also shows a vanishing point 1317 (or perspective point) for the target rectangles of FIG. 13. Again, the vanishing point 1317 may be pre-determined and may exist at any point including points outside the application boundary 1300. The vanishing point 1317 may also be within the first target rectangle 1301. As seen in FIG. 13, the vanishing point 1317 is positioned opposite to the first target rectangle 1301 in a horizontal direction. The vanishing point 1317 is also adjacent to the first target rectangle 1301 in the vertical direction. The position and dimensions of the first target rectangle 1301 and the position of the vanishing point 1317 may be determined automatically by the processor 305 at any time based on the size of the application boundary 1300. For example, the position and dimensions of the first target rectangle 1301 and the position of the vanishing point 1317 may be determined upon resizing of the application window 100 containing the application boundary 1300. The dimensions of the first target rectangle 1301 may be reduced as the size of the application boundary 1300 is reduced. Further, the dimensions of the first target rectangle 1301 may be increased as the size of the application boundary 1300 is increased.

Again, perspective lines 1303 and 1305 pass through the vanishing point 1317 and through the end vertices 1304, 1306 of the adjacent edge 1302 (i.e., the edge of the target rectangle 1301 that falls within the same quadrant as the vanishing point 1317), respectively. A perpendicular interval 1308 runs from the vanishing point 1317 to the adjacent edge 1302, and is perpendicular to the adjacent edge 1302. The target rectangles 1301, 1311 and 1312 are positioned such that the end vertices of the adjacent edge of each target rectangle intersect with the perspective lines 1303, 1305 and the target rectangle is scaled accordingly. Again, the adjacent edge of each of the target rectangles 1301, 1311 and 1312 is spaced along the perpendicular interval 1308 according to Formula (1) as described above. However, in the case of the stack 1309, the left edges (e.g., 1353) of each of the target rectangles 1301, 1311 and 1312 are also scaled according a predetermined ratio with respect to the corresponding adjacent edge (e.g., 1314) of each target rectangle to provide the 3D perspective effect to the stack 1309. The left edges (e.g., 1353) of each of the target rectangles (e.g., 1311) are scaled so as to be smaller than the corresponding adjacent edge (e.g., 1314). In the method 700, corresponding sides of each image to be displayed are scaled to fit corresponding edges of each respective target rectangle 1301, 1311 and 1312, in a similar manner to the perspective stack 609.

Figure 8A:
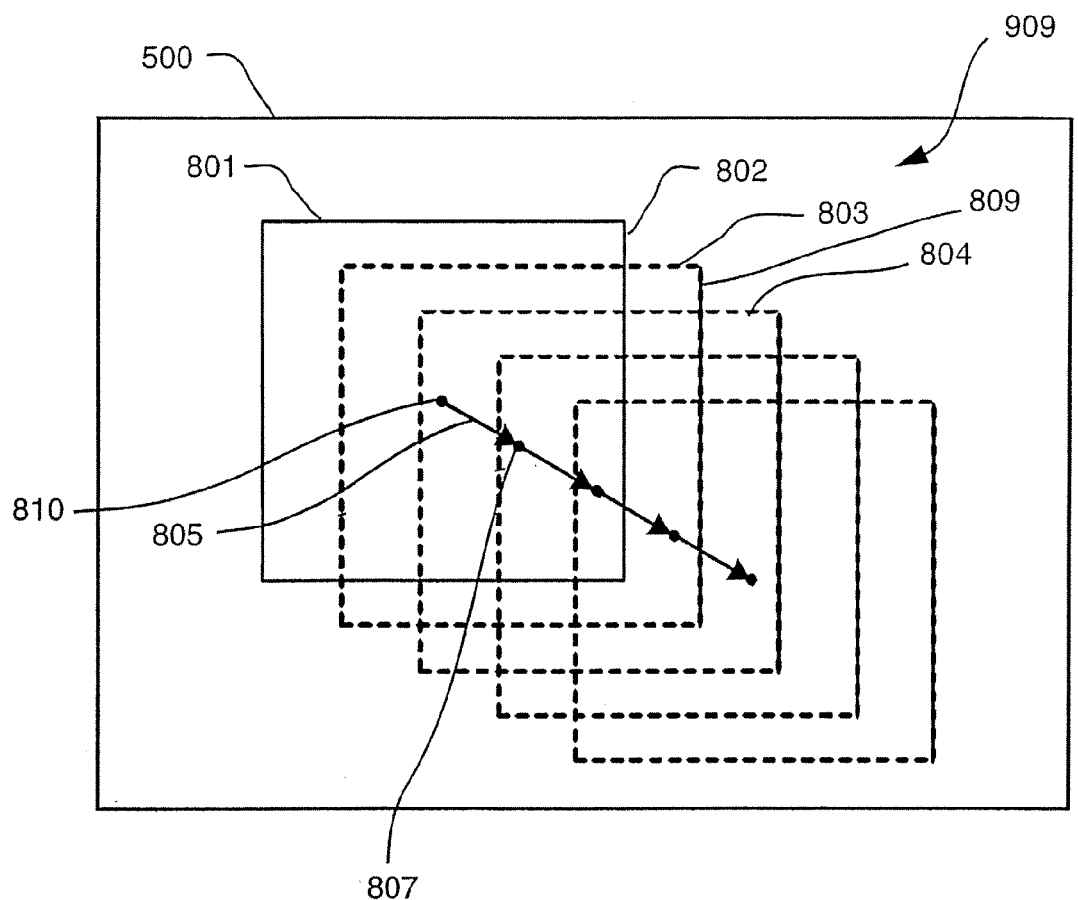
FIG. 8A shows a series of target rectangles arranged in a non-perspective stack within the application boundary.

In still another implementation of the method 700, the images 102, 103 and 104 may be arranged in a non-perspective stack. FIG. 8A shows a series of target rectangles 801, 803 and 804, arranged in a non-perspective stack 909 within the application boundary 500. The non-referenced rectangles shown in phantom lines of FIG. 8A also represent target rectangles. However, these non-referenced rectangles will not be referred to specifically. A reference to "the target rectangles 801, 803 and 804" below refers to all of the target rectangles shown in FIG. 8A including those target rectangles in phantom lines, unless a target rectangle is referred to specifically.

In contrast to the target rectangles 501, 511 and 512, each of the target rectangles 801, 803 and 804 are of equal size. The target rectangles 801, 803 and 804 may be used in the method 700. In this instance, the selected side of each of the images 102, 103 and 104 may be scaled to fit to a corresponding side of a corresponding one of the target rectangles 801, 803 and 804, as at step 703, of the method 700. The size and position of the target rectangle 801 within the application boundary 500 of FIG. 8A may be predetermined prior to execution of the method 700. The other target rectangles 803 and 804 may be arranged relative to the target rectangle 801 according to offset vectors (e.g., the offset vector 805), as seen in FIG. 8A. The offset vectors may also be predetermined prior to execution of the method 700.

The offset vector 805 starts at a centre point 810 of the target rectangle 801. The next target rectangle 803 is positioned so that the centre point 807 of the target rectangle 803 is positioned at the end of the offset vector 805, as seen in FIG. 8A. Similarly, the other target rectangles (e.g., 804) are positioned so that the corresponding centre point of the target rectangle is positioned at the end of a corresponding offset vector. There are a predetermined number of target rectangles 801, 803 and 804 in the stack 909 of target rectangles of FIG. 8A. Accordingly, each one of the offset vectors of FIG. 8A is associated with one of the target rectangles 801, 803 and 804 where the offset vector starts from the centre point of the associated target rectangle. Alternatively, each of the offset vectors of FIG. 8A may start from a different predetermined point within a corresponding one of the target rectangles.

Figure 8B:
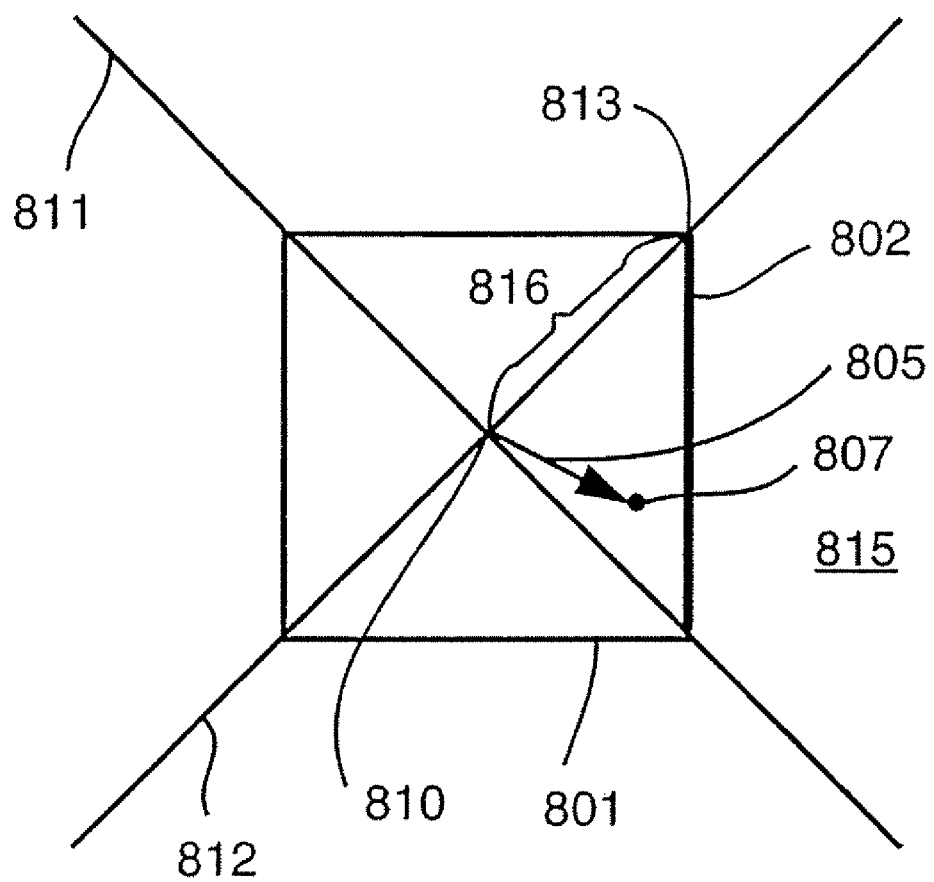
FIG. 8B shows the first target rectangle of the stack of FIG. 8 and an offset vector used to determine the position of the second target rectangle of the stack.

FIG. 8B shows the target rectangle 801 of the stack 909. FIG. 8B also shows the offset vector 805. The offset vector 805 starts at the centre point 810 of target rectangle 801 and ends at point 807. The target rectangle 801 is shown in FIG. 8B with diagonal dividing lines 811 and 812 intersecting at the centre point 810 and passing through diagonally opposite vertices (e.g., 813) of the target rectangle 801. The diagonal dividing lines 811 and 812 form four quadrants (e.g., 815) in a space within and surrounding target rectangle 801. Each quadrant (e.g., 815) fully encompasses one edge (e.g., 802) of the target rectangle 801.

The end point 807 of the vector 805 represents the centre point 807 of the next target rectangle 803 in the stack 909. The end point 807 of the vector 805 may fall within any one of the quadrants (e.g., 815). Alternatively, the end point 807 may fall exactly on one of the diagonal dividing lines 811 and 812. A vector end point falling on one of the diagonal dividing lines 811 and 812 may be assumed to fall within the quadrant immediately adjacent to a corresponding segment (in a clockwise direction) of the dividing line on which the vector end point falls. For example, if the end point 807 of the vector 805 falls directly on segment 816 of the dividing line 812, then the end point 807 may be assumed to fall within quadrant 815.

The edge 802 of the target rectangle 801 falls within the same quadrant 815 as the end point 807 of the vector 805 and is referred to as the 'adjacent edge' of the target rectangle 801. The adjacent edge 802 corresponds to the 'adjacent side' of the target rectangle 801.

Figure 9:
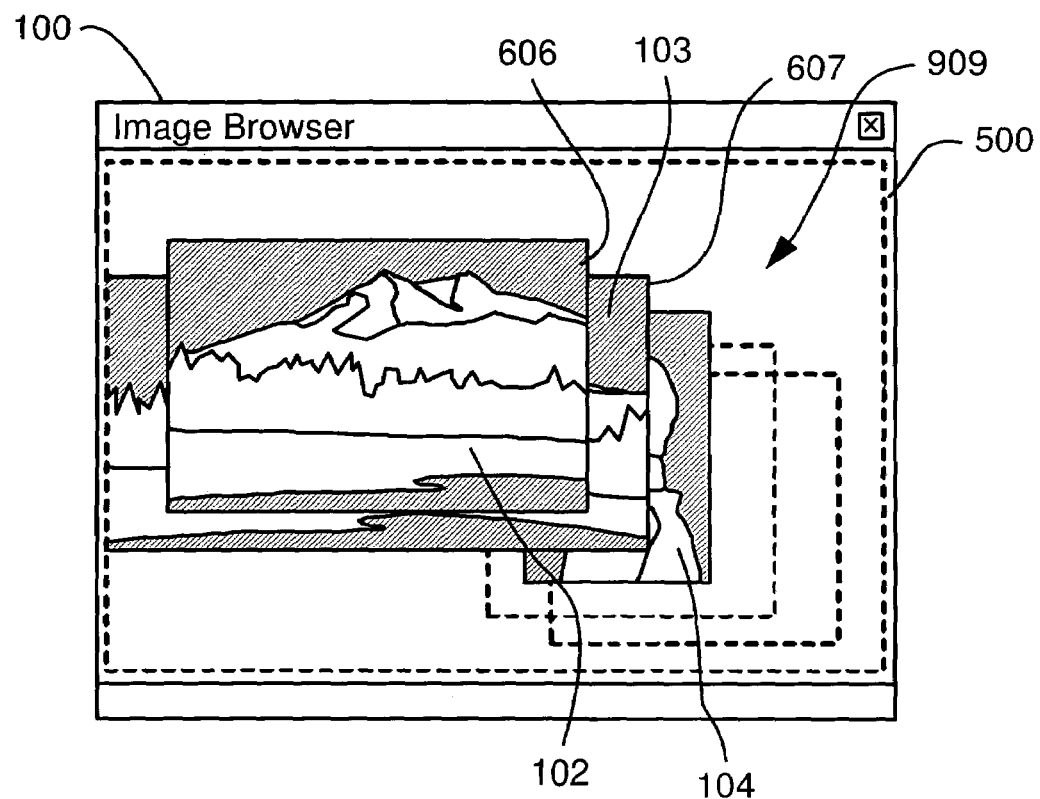
FIG. 9 shows the application window of FIG. 1 with the images arranged in a non-perspective stack according to the arrangement of target rectangles of FIG. 8A.

Using the arrangement of the target rectangles 801, 803 and 804 shown in FIG. 8A, at step 703 of the method 700, the processor 305 may display the image 102 on the display device 314, for example. In this instance, at step 703, the processor 305 scales the image 102 so as to fit the side 606 of the image 102 to a corresponding edge 802 of the target rectangle 801. For example, FIG. 9 shows the images 102, 103 and 104 arranged in a stack 909 according to the arrangement of the target rectangles 801, 803 and 804 of FIG. 8A. The images 102, 103 and 104 are configured within the application boundary 500. The first (or front-most) image 102 is positioned according to the first target rectangle 801. The position of the side 606 of the image 102, as seen in FIG. 9, corresponds to the adjacent edge 802 of the target rectangle 801. The side 606 of the image 102 is also matched in length to the adjacent edge 802.

Again, using the arrangement of the target rectangles 801, 803 and 804 shown in FIG. 8A, at step 705 of the method 700, the processor 305 may display the second image 103, such that the first image 102 overlays the second image 103. The second image 103 may then be positioned relative to the image 102, as at step 705, according to the offset vector 805. As described above, the centre point 807 of the target rectangle 803 corresponding to the second image 103 is positioned so as to correspond with the end of the offset vector 805, as seen in FIG. 8. The position of the side 607 of the image 103, as seen in FIG. 9, corresponds to the adjacent edge 809 of the target rectangle 803.

As seen in FIG. 9, each successive image (e.g., 104) in the stack 909 is similarly positioned according to each successive target rectangle. For example, the image 104 is positioned according to the target rectangle 804. Each of the images 102, 103 and 104 is scaled such that the side of the image that corresponds to the adjacent edge of the corresponding target rectangle is matched in length to that adjacent edge, whilst maintaining the aspect ratio of the image. For example, the side 607 of the image 103, as seen in FIG. 9, corresponds to the adjacent edge 809 of the target rectangle 803.

For the stacks 609 and 909 a straight line may be drawn through at least one corresponding point on each of the images 102, 103 and 104 in the stacks 609 and 909. Accordingly, the stacks 609 and 909 may be said to follow a straight path. However, a stack of images may follow a non-straight path. Such a non-straight path may follow any arbitrary path. For example, a non-straight path may curve into the distance or may curve away and back again.

The images 102, 103 and 104 may be arranged in a stack following an arbitrary path defined in either two (2) or three (3) dimensions. Such a path may be defined as one or more of the following:

(i) a series of points;
(ii) a spline through a series of points (e.g., a Catmull-Rom spline or a cardinal spline);
(iii) a Bezier curve; or
(iv) a Non-uniform Rational B-spline (NURBS) curve.

In arranging the images 102, 103 and 104 in a stack following an arbitrary path, the adjacent edge of corresponding target rectangles may vary depending on the direction of the path at any particular point. The images 102, 103 and 104 may be spaced equally along the path, or may be spaced along the path according to a mathematical function of the index of the image and the total length of the path. Similarly, the target rectangles of such a stack may be equally sized or may be scaled according to a function of a distance along the path. The target rectangles of a stack following an arbitrary path may be shown in true perspective in the case of a path defined in 3D.

Figure 10:
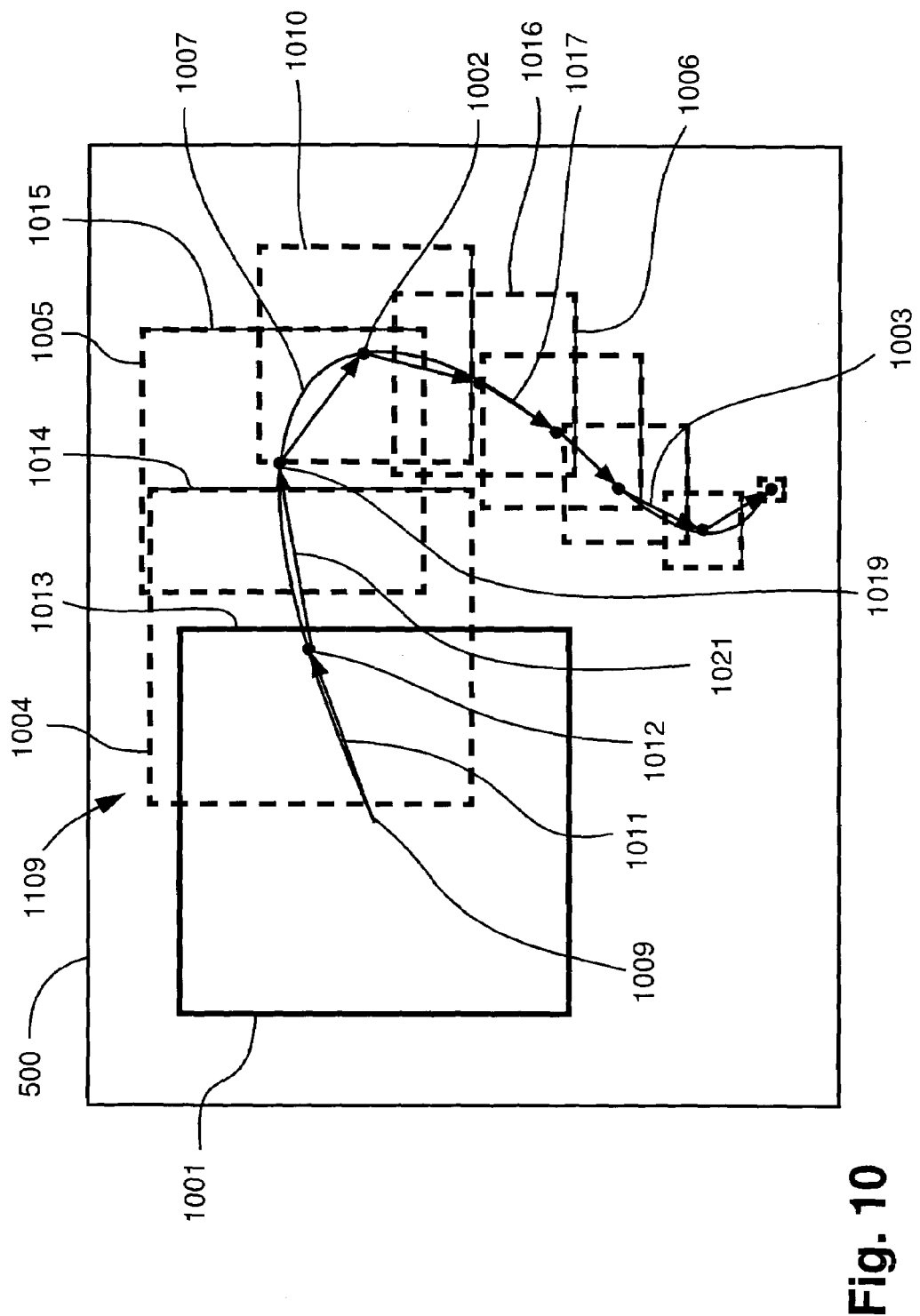
FIG. 10 shows a series of target rectangles arranged in a stack following an arbitrary path.

FIG. 10 shows a series of target rectangles 1001, 1004 and 1005 arranged in a stack 1109 following an arbitrary path 1007 within the application boundary 500. The non-referenced rectangles shown in phantom lines in FIG. 10 also represent target rectangles. However, these rectangles will not be referred to specifically. A reference to "the target rectangles 1001, 1004 and 1005" below refers to all of the target rectangles shown in FIG. 10, including the target rectangles shown in phantom lines, unless a target rectangle (e.g., the target rectangle 1001) is referred to specifically.

The target rectangles 1001, 1004 and 1005 arranged in the stack 1109 following the arbitrary path 1007 may be used in the method 1200 as seen in FIG. 12. Again, the method 1200 may be implemented as software resident in the hard disk drive 310 and being controlled in its execution by the processor 305. In the method 1200, each of the images 102, 103 and 104 may be scaled to fit a corresponding side of one of the target rectangles 1001, 1004 and 1005. The size and position of the target rectangle 1001 within the application boundary 500 of FIG. 10 may be predetermined prior to execution of the method 1200. The other target rectangles 1004 and 1005 may be arranged relative to the target rectangle 1001 along the arbitrary path 1007, as seen in FIG. 10. The arbitrary path 1007 may be determined prior to the execution of the method 1200. As seen in FIG. 10, the path 1007 starts at the centre point 1009 of the first target rectangle 1001.

Points (e.g., 1002) are distributed along the length of the path 1007, with each point defining the centre point of a respective one of the target rectangles. For example, the point 1002 on the path 1007 defines the centre point of target rectangle 1010. The size of each one of the target rectangles 1004 and 1005 is scaled with respect to the first target rectangle 1001 based on the determination of one (1) minus the proportion of the, distance£ of the centre point of the target rectangle along the path 1007 from the centre point 1009 as a ratio of the, total length£ of the path 1007. For example, the target rectangle 1005 is scaled with respect to the first target rectangle 1001 based on one (1) minus the proportion of the distance of the centre point 1019 from the centre point 1009 as a ratio of the total length of the path 1007. The target rectangles 1004 and 1005 may be arranged relative to the target rectangle 1001 according to offset vectors (e.g., 1011), as seen in FIG. 10. The offset vectors may be predetermined prior to execution of the method 1200. For the target rectangles 1001, 1004 and 1005, the offset vectors 1003 may be determined according to a shortest linear path between adjacent points (e.g., 1002) on the path 1007. Each one of the offset vectors is associated with one of the target rectangles. Each one of the offset vectors starts at a centre point of the associated target rectangle. For example, the offset vector 1011 starts at the centre point 1009 of the target rectangle 1001. The length of the offset vector 1011 is determined as the shortest linear path between the point 1009 and a next point 1012 on the path 1007.

Again, the edge 1013 of the target rectangle 1001 falls within the same quadrant (i.e., a quadrant formed by diagonal dividing lines passing through diagonally opposite vertices of the target rectangle 1001) as the point 1012 (i.e., the end point) of the vector 1011 and is referred to as the 'adjacent edge' of the target rectangle 1001. The adjacent edge 802 corresponds to an 'adjacent side' of the target rectangle 1001.

The end point of one or more of the vectors of FIG. 10 may fall within any one of the quadrants in a space within and surrounding the target rectangle 1001. Alternatively, the end point of one or more of the vectors may fall exactly on a diagonal dividing line passing through diagonally opposite vertices of the target rectangle 1001. Again, as with the stack 909, a vector end point falling on such a diagonal dividing line may be assumed to fall within the quadrant immediately adjacent to a corresponding segment (in a clockwise direction) of the dividing line on which the vector end point falls. As seen in FIG. 10, the adjacent edge 1013 of the first target rectangle 1001 corresponds to the right hand edge of the target rectangle 1013. However, the adjacent edge 1006 of target rectangle 1016 corresponds to the bottom edge of the target rectangle 1016, due to a change in direction of the path 1007 and hence the direction of associated offset vector 1017 of the target rectangle 1016.

Figure 11:
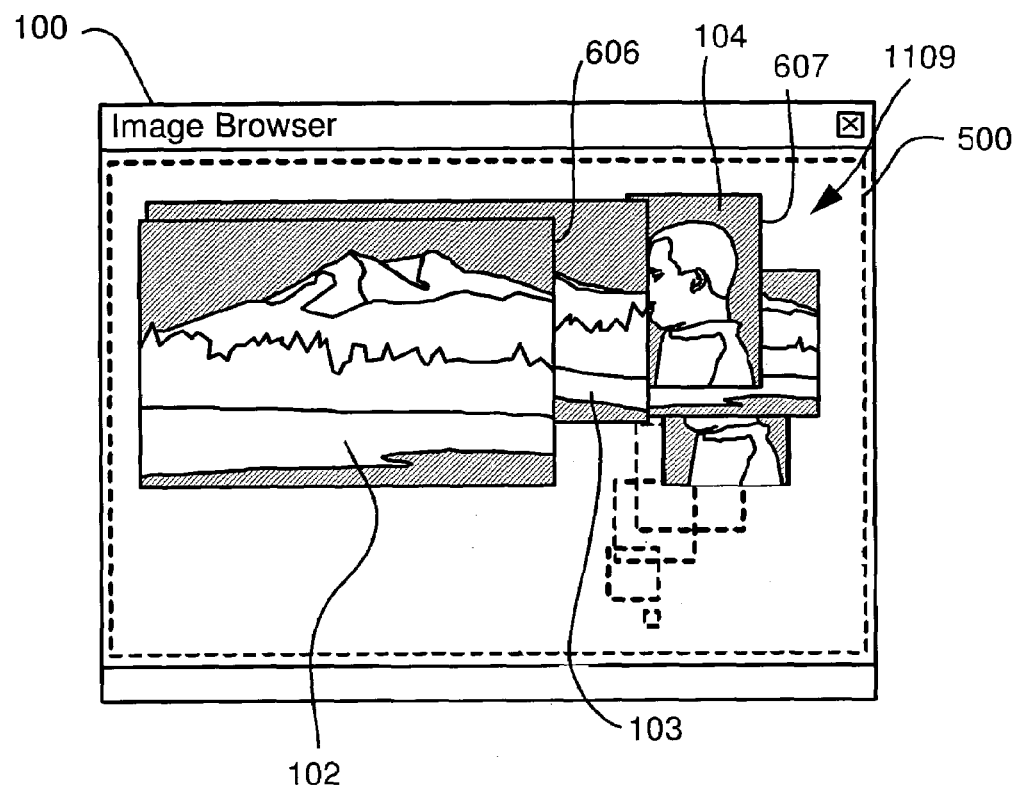
FIG. 11 shows the application window of FIG. 1 with the images arranged in a stack according to the arrangement of target rectangles of FIG. 10.

The method 1200 begins 1201, where the processor 305 selects a side for the first image (i.e., 102) to be displayed. For the stack 1109, the selected side is determined based on the direction of the path 1007 as described above. At the next step 1203, the processor 305 displays the first image (e.g., the image 102). The first image 102 may be displayed on the display device 314, for example. At the next step 1203, the processor 105 scales the image 102 so as to fit the side 606 of the image 102 to the adjacent edge 1013 of the target rectangle 1001. For example, FIG. 11 shows the images 102, 103 and 104 arranged in the stack 1109 according to the arrangement of the target rectangles 1001, 1004 and 1005 of FIG. 10. The images 102, 103 and 104 are configured within the application boundary 500. The first (or front-most) image 102 is positioned according to the first target rectangle 1001. The position of the side 606 of the image 102, as seen in FIG. 10, corresponds to the adjacent edge 1013 of the target rectangle 1001. The side 606 of the image 102 is also matched in length to the adjacent edge 1013.

At the next step 1205, if the processor 305 determines that there are more images to be displayed then the method 1200 returns to step 1201. Otherwise the method 1200 concludes. At the second execution of the step 1201, the processor 305 selects a side for the second image 103 to be displayed. The selected side for the second image 103 is determined based on the direction of the path 1007 and the end point 1019 of the offset vector 1021, as described above. Then at the second execution of the step 1203, the processor 305 may display the second image 103, such that the first image 102 overlays the second image 103.

The second image 103 may be positioned relative to the image 102 according to the offset vector 1011. The centre point 1012 of the target rectangle 1004 corresponding to the second image 103 is positioned so as to correspond with the end of the offset vector 1011, as seen in FIG. 10. The position of the side 607 of the image 103, as seen in FIG. 11, corresponds to the adjacent edge 1014 of the target rectangle 1004.

Again, at the next step 1205, if there are any more images to be displayed, then the method 1200 returns to step 1201 and each successive image (e.g., 104) is similarly positioned according to each successive target rectangle. For example, the image 104 is positioned according to the target rectangle 1005. Each of the images 102, 103 and 104 is scaled such that the side of the image that corresponds to the adjacent edge of the corresponding target rectangle is matched in length to that adjacent edge, whilst maintaining the aspect ratio of the image. For example, the side 607 of the image 104, as seen in FIG. 11, corresponds in length to the adjacent edge 1015 of the target rectangle 1004.

As described above, in one implementation of the method 700 described above a predetermined vanishing point is used. The use of the predetermined vanishing point in accordance with the described method has the advantage over "a two point perspective" method in that the front faces of the images 102, 103 and 104 are kept in parallel. This reduces distortion in the displayed images.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequentially.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of displaying a plurality of images, each image having an associated aspect ratio and at least one of said images having a different aspect ratio to at least one other of said images, said method comprising the steps of:
   selecting a side of the plurality of images;
   displaying a first of said images and a second of said images substantially behind said first image, said first image being scaled so that the aspect ratio of said first image is maintained, and said second image being scaled based on a distance between the selected side of the first image and the selected side of the second image, so that the aspect ratio of said second image is maintained.

2. A method according to claim 1, wherein said second image is scaled according to a predetermined ratio with respect to said first image.

3. A method according to claim 2, wherein said plurality of images are displayed in a perspective stack.

4. A method according to claim 3, wherein said perspective stack is a three dimensional (3D) perspective stack.

5. A method according to claim 3, wherein said predetermined ratio is based on the number of images being displayed.

6. A method according to claim 3, wherein the selected sides of said first image and said second image are adjacent to a predetermined point.

7. A method according to claim 3, wherein said distance (dist) is the distance along an interval from an edge of said first space to an edge of said second space and is determined as follows:

$$dist = l \cdot (i/n)^{0.4}$$

where:
i=0 for the first space, i=1 for the second space, i=2 for a third space following the second space, and so on;
l represents the length of the interval; and
n represents the number of spaces.

8. A method according to claim 3, wherein the spaces are target rectangles.

9. A method according to claim 3, wherein the spaces are parallelograms.

10. A method according to claim 3, wherein the spaces are trapezoids.

11. A method according to claim 6, wherein said perspective stack vanishes at said predetermined point.

12. A method according to claim 6, wherein said predetermined point falls within a predetermined boundary within which said images are being displayed.

13. A method according to claim 6, wherein said predetermined point falls outside a predetermined boundary within which said images are being displayed.

14. A method according to claim 2, wherein said second image is positioned with respect to the first image according to an offset vector.

15. A method according to claim 14, wherein the selected side of said second image is positioned with respect to the selected side of said first image according to said offset vector.

16. A method according to claim 15, wherein said plurality of images is displayed in a non-perspective stack.

17. A method according to claim 16, wherein said predetermined ratio is equal to one.

18. A method according to claim 15, wherein said plurality of images are displayed in a stack which follows an arbitrary path.

19. A method according to claim 18, wherein said predetermined ratio is based on the distance of the centre point of said second image on said path with respect to the center point of said first image on said path.

20. A method according to claim 2, wherein said distance is based on said predetermined ratio.

21. A method according to claim 1, wherein the selected side of said first image is fitted to a corresponding side of a first space having a plurality of edges and the selected side of said second image is fitted to a corresponding side of a second space having a plurality of edges.

22. A method of displaying a plurality of images on a display device, each image having first and second dimensions defining an aspect ratio and at least one image of said images having a different aspect ratio to at least one other of said images, said method comprising the steps of:

selecting a side of the plurality of images; and displaying a first of said images, and displaying a second of said images substantially behind said first image, the first and second dimensions of said first image being scaled so as to maintain the aspect ratio of said first image, and the first and second dimensions of said second image being scaled based on a distance between the selected side of the first image and the selected side of the second image, so as to maintain the aspect ratio of said second image, wherein at least one of the first and second scaled dimensions of said second image is determined, by a processor, according to a predetermined ratio with respect to a corresponding scaled dimension of said first image.

23. A method according to claim 22, wherein said predetermined ratio is varied.

24. A method according to claim 23, wherein said plurality of images is displayed in a perspective stack.

25. A method according to claim 24, wherein said predetermined ratio is based on the number of images being displayed.

26. A method according to claim 24, wherein said perspective stack is a three dimensional (3D) perspective stack.

27. A method according to claim 24, wherein the first dimensions of said first image and said second images are adjacent to a predetermined point.

28. A method according to claim 27, wherein said predetermined point falls within a predetermined boundary within which said images are being displayed.

29. A method according to claim 27, wherein said predetermined point falls outside a predetermined boundary within which said images are being displayed.

30. A method according to claim 27, wherein said perspective stack vanishes at said predetermined point.

31. A method according to claim 23, wherein said second image is positioned with respect to the first image according to an offset vector.

32. A method according to claim 31, wherein said second image is positioned with respect to said first image according to said offset vector.

33. A method according to claim 32, wherein said plurality of images is displayed in a non-perspective stack.

34. A method according to claim 33, wherein said predetermined ratio is equal to one.

35. A method according to claim 32, wherein said plurality of images is displayed in a stack which follows an arbitrary path.

36. A method according to claim 35, wherein said predetermined ratio is based on the distance of the centre point of said second image on said path with respect to said first image.

37. A method according to claim 22, wherein the regions are trapezoids.

38. A method according to claim 22, wherein the regions are parallelograms.

39. A method of display a plurality of images on a display device, said method comprising the steps of:

selecting a side of the plurality of images;

displaying a first of said plurality of images, and a second of said images substantially behind the first image, said first image being scaled so that the aspect ratio of said first image is maintained, and said second image being scaled based on a distance between the selected side of the first image and the selected side of the second image, so that the aspect ratio of said second image is maintained, wherein said second image is positioned according to a predetermined ratio based on said predetermined first space.

40. An apparatus for displaying a plurality of images on a display device, each image having first and second dimensions defining an aspect ratio and at least one image of said images having a different aspect ratio to at least one other of said images, said apparatus comprising:

selection means for selecting a side for the plurality of images; and display means for displaying a first of said images, and a second of said images substantially behind said first image, the first and second dimensions of said first image being scaled so as to maintain the aspect ratio of said first image, and the first and second dimensions of said second image being scaled based on a distance between a selected side of the first image and a selected side of the second image, so as to maintain the aspect ratio of said second image, and wherein at least one of the first and second scaled dimensions of said second image are determined, by a processor, according to a predetermined ratio with respect to a corresponding scaled dimension of said first image.

41. An apparatus for displaying a plurality of images, each image having an associated aspect ratio and at least one of said images having a different aspect ratio to at least one other of said images, said apparatus comprising:

selection means of selecting a side for the plurality of images;

a display means for displaying a first of said images, and a second of said images substantially behind said first image, said first image being scaled so that the aspect ratio of said first image is maintained, and said second image being scaled based on a distance between the selected side of the first image and the selected side of the second image, so that the aspect ratio of said second images is maintained.

42. A computer readable storage medium, having a program recorded thereon, where the program is configured to make a computer execute a procedure to display a plurality of images on a display device, each image having a first and second dimensions defining an aspect ratio and at least one image of said images having a different aspect ratio to at least one other of said images, said program comprising:

code for selecting a side for the plurality of images;

code for displaying a first of said images, and a second of said images substantially behind said first image, the first and second dimensions of said first image being scaled so as to maintain the aspect ratio of said first image; the first and second scaled dimensions of said second image being scaled based on a distance between the selected side of the first image and the selected side of the second image, so as to maintain the aspect ratio of said second image, and wherein at least one of the first and second scaled dimensions of said second image is determined, by a processor, according to a predetermined ratio with respect to a corresponding scaled dimension of said first image.

43. A computer readable storage medium, having a program recorded thereon for displaying a plurality of images, each image having an associated aspect ratio and at least one of said images having a different aspect ratio to at least one other of said images, said program comprising:

code for selecting a side for the plurality of images; and code for displaying a first of said images, and a second of said images substantially behind said first image, said first image being scaled so that the aspect ratio of said first image is maintained; and said second image being scaled based on a distance between the selected side of the first image and the selected side of the second image, so that the aspect ratio of said second image is maintained.

* * * * *